United States Patent
Pyötsiä et al.

(10) Patent No.: US 6,546,295 B1
(45) Date of Patent: Apr. 8, 2003

(54) METHOD OF TUNING A PROCESS CONTROL LOOP IN AN INDUSTRIAL PROCESS

(75) Inventors: Jouni Pyötsiä, Helsinki (FI); Mika Kreivi, Vantaa (FI); Pasi Heikkinen, Espoo (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 09/505,370

(22) Filed: Feb. 16, 2000

(30) Foreign Application Priority Data

Feb. 19, 1999 (FI) .................................. 990360

(51) Int. Cl.[7] ............................................. G05B 13/02
(52) U.S. Cl. ............................ 700/37; 700/28; 700/38; 700/39; 700/40; 700/44; 700/45; 706/900; 318/625; 318/561; 318/568.18; 318/610
(58) Field of Search ....................... 700/28, 37, 38, 700/39, 40, 41, 42, 43, 44–45, 46, 83, 85, 213; 706/900; 318/625, 561, 568.18, 610

(56) References Cited

U.S. PATENT DOCUMENTS

| | | | |
|---|---|---|---|
| 4,922,412 A | | 5/1990 | Lane et al. .................... 700/37 |
| 5,014,185 A | * | 5/1991 | Saito et al. .................... 700/83 |
| 5,153,807 A | | 10/1992 | Saito et al. .................... 700/37 |
| 5,184,122 A | | 2/1993 | Decious et al. ......... 340/870.16 |
| 5,202,821 A | * | 4/1993 | Bauck et al. ............. 360/77.02 |
| 5,229,699 A | * | 7/1993 | Chu et al. .................... 318/610 |
| 5,295,061 A | * | 3/1994 | Katayama et al. ............ 700/37 |
| 5,394,322 A | | 2/1995 | Hansen ......................... 700/37 |
| 5,410,730 A | | 4/1995 | Longsdorf et al. .......... 709/200 |
| 5,434,774 A | * | 7/1995 | Seberger ...................... 568/749 |
| 5,453,925 A | * | 9/1995 | Wojsznis et al. ............. 318/561 |
| 5,566,065 A | | 10/1996 | Hansen et al. ................. 700/46 |
| 5,573,032 A | * | 11/1996 | Lenz et al. ................... 137/486 |
| 5,583,755 A | | 12/1996 | Ichikawa et al. .............. 700/37 |
| 5,631,825 A | * | 5/1997 | van Weele et al. ........... 700/83 |
| 5,818,714 A | | 10/1998 | Zou et al. ...................... 700/37 |
| 5,825,664 A | | 10/1998 | Warrior et al. ................. 700/19 |
| 6,044,305 A | * | 3/2000 | Larson et al. ................. 700/11 |
| 6,112,125 A | * | 8/2000 | Sandusky ...................... 700/28 |
| 6,263,251 B1 | * | 7/2001 | Rutschmann ............. 369/44.36 |
| 6,330,484 B1 | * | 12/2001 | Qin ............................. 700/30 |

FOREIGN PATENT DOCUMENTS

| | | |
|---|---|---|
| EP | 793 155 | 9/1997 |
| WO | 98/06016 | 2/1998 |
| WO | WO 98/14851 | 4/1998 |

* cited by examiner

*Primary Examiner*—Ramesh Patel
(74) *Attorney, Agent, or Firm*—Pillsbury Winthrop LLP

(57) ABSTRACT

An industrial process material flow within an industrial process is controlled by a process control loop that includes a process controller, a field device controller and a field device in the process as well as process variable feedback from the process to the process controller. Both the process controller and the field device controller, such as a valve controller, are fine-tuned so that their interaction is taken into account and controller parameters, which provide an optimal control loop performance are found. This results in a significant improvement in the control loop performance, i.e., in a lower process variability, as compared with the traditional tuning method, which does not take into account the interaction between the two controllers.

18 Claims, 3 Drawing Sheets

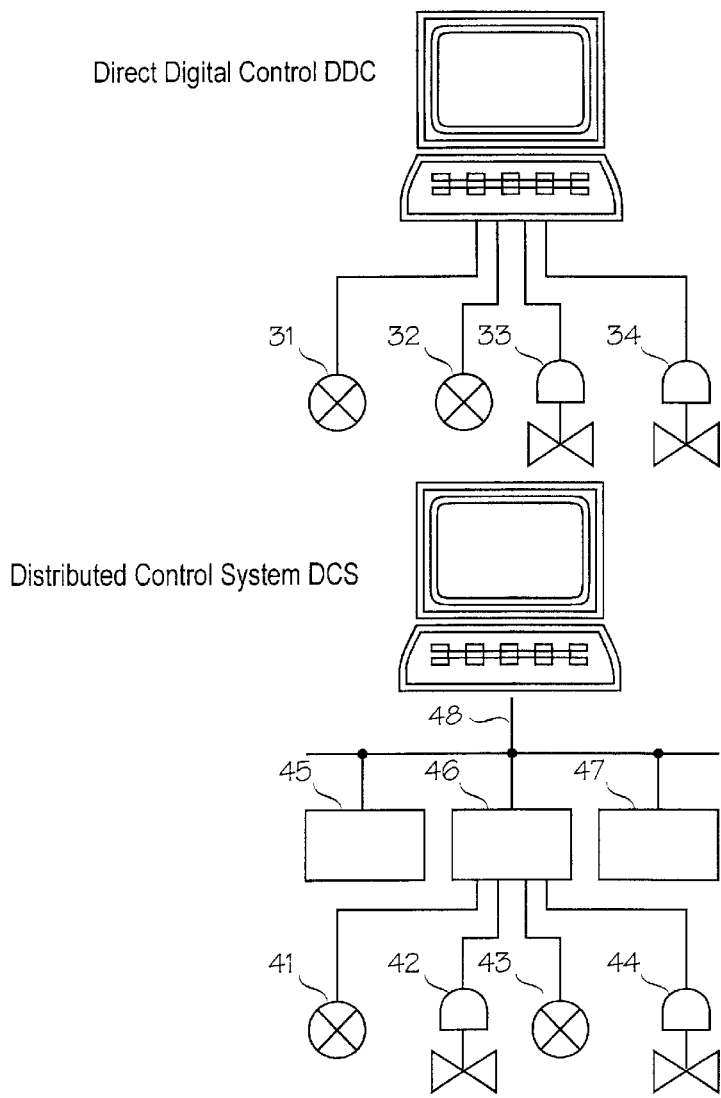
Fig. 3
Fig. 4
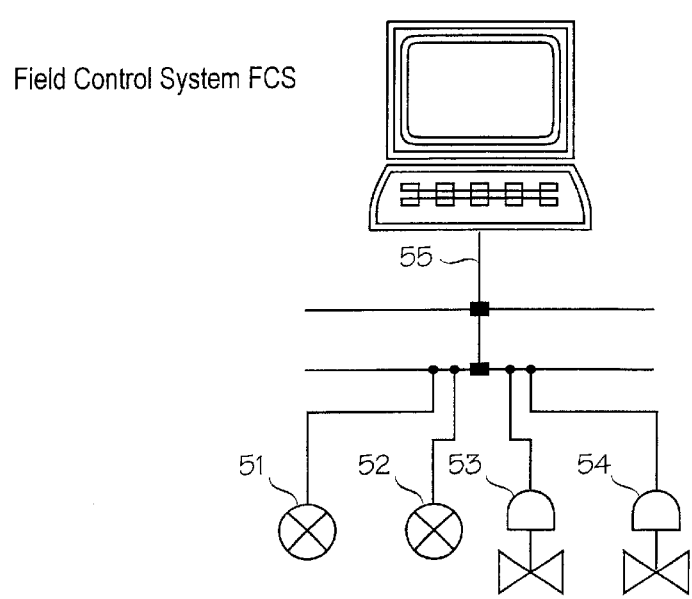
Fig. 5

METHOD OF TUNING A PROCESS CONTROL LOOP IN AN INDUSTRIAL PROCESS

FIELD OF THE INVENTION

The present invention relates to control systems of industrial processes, and particularly to tuning a process control loop.

BACKGROUND OF THE INVENTION

In process industries, such as pulp and paper, refining, petrochemical and chemical industries, the material flows in the process are controlled by a variety of control valves installed in a piping system of a plant. The material flow may include any flowing material, such as fluids, slurries, liquid, gases and steam. In the simplest configuration the control valve may be a manually adjustable mechanical valve. However, usually an automated control of the valve is used, and therefore the control valve is often provided with a valve controller and an actuator. The valve controller and the actuator adjust the position of the control valve (e.g. the opening of the valve) according to a control input (e.g. pneumatic or electric control input) from the process control system. The valve controller may also be called a valve positioner.

FIG. 1 shows a functional block diagram of a control valve. A valve controller (i.e. a positioner) 10 controls the valve travel/position (h) with the help of a torque generated by an actuator 11. Position information (h) is fed back from the actuator 11 or a control valve 12 to an adder in the input of the valve controller 10. Operation of the valve controller is mainly based on an error (e) between the input signal (the control signal from the process controller) and the position (h). The valve controller 10 operates so as to minimize the error by a control algorithm, such as a state or PID algorithm. The control algorithm is tailored for each control valve and can be tuned when installed or during operation, if necessary. The tuning may include change of the gain parameters, for example. In the valve controller 10 it is also possible to use one or more additional feedbacks, such as a velocity feedback and pressure feedback of an actuator cylinder, to achieve a more balanced and accurate valve position control action. For example, the gain parameters of the control algorithms may be changed according to the velocity of the valve. A valve controller, an actuator and a valve are normally integrated to form a field device.

FIG. 2 illustrates a typical model of a process control loop which controls one control valve 22 and thereby one material flow in the process. An industrial process may include hundreds of control valves and respective process control loops. The process control loop includes a process controller 21 with a control algorithm which provides a control signal $P_{c1}$ to the control valve 22 according to a setpoint value (from the control room computer, for example) and a measured process variable. The control algorithm may be any algorithm used in control systems, such as PID. The control signal $P_{c1}$ entered into the control valve 22 controls the valve position, the valve travel and thereby the material flow in the process. A desired process variable is measured by a measurement transmitter 24 and compared to the setpoint value of the same process variable so as to provide an error signal e2 which is entered into the process controller 10. The process controller's function is to minimize the control error. The process control error is typically caused by setpoint changes and process disturbances. Control errors can not be completely removed because of time delays in the processes and the field devices. Further, accuracy is limited in measurements and control. When installed, the process controller 21 is tuned to operate as well as possible in different process load situations and at different operation points. The tuning is normally carried out by causing disturbance in the process and measuring how well the process controller handles them.

Traditionally the valve controller, or any field device controller, has been tuned alone independently from the process controller. However, this traditional tuning is not the optimal tuning method, since there actually is interaction between the two controllers. The inventors have observed that a valve controller which is optimally tuned from the valve point of view may result in a degradation of the performance of the process controller. On the other hand, tuning the process control may degrade the performance of an "optimally" tuned valve controller.

DISCLOSURE OF THE INVENTION

An object of the invention is to provide a tuning method and a tuning system which provide a more optimal performance of a process control loop.

An aspect of the invention is a method for tuning a process control loop controlling material flow within an industrial process, said process control loop comprising a process controller, a field device controller, a field device, a first feedback from the field device to the field device controller, the industrial process and means for measuring a process variable in the process and for providing a second feedback from the process to the process controller, said method comprising steps of tuning the process controller, fine-tuning the field device controller and the process controller by finding for the two controllers control parameters, whereby the interaction of the controllers provides a desired process variability.

An another aspect of the invention is a control system comprising a process control loop controlling material flow within an industrial process, said process control loop comprising a process controller, a valve controller, a field device in the process, a feedback from the field device to the field device controller, and a process variable feedback from the process to the process controller, a tuning system for the process control loop, said tuning system being arranged to fine tune the field device controller and the process controller by finding for the two controllers control parameters, whereby the interaction of the controllers provides a desired process variability.

In the present invention, both the process controller and the field device controller, such as a valve controller, are fine-tuned so that their interaction is taken into account in order to find control parameters which provide an optimal control loop performance are found. This results in a significant improvement in the control loop performance, i.e. in a lower process variability, as compared with the traditional tuning method which does not take into account the interaction between the two controllers.

In a preferred embodiment of the invention a rough tuning of the process controller is first made during normal process operation using a combined field device and process model, i.e. the field device, e.g. a valve, is considered as part of the process. Thereafter, a fine-tuning of the process controller and the field device (e.g. valve) controller is done in one or more tuning cycles so that the field device controller is tuned to work optimally with the process controller and vice versa, by finding the control parameters which provide a desired control loop performance.

In an embodiment of the invention the fine-tuning is carried out during a process shut-down. In this embodiment a real field device, such as a valve, is used to control a simulated process. In other words, the process controller controls a real valve and a measured valve position is fed into the simulated process, for example.

In yet another embodiment of the invention, the fine-tuning is carried out using a simulated process and a simulated field device (e.g. a valve) which is controlled by the process controller. This embodiment allows an offline tuning of the process controller even during normal process operation, without disturbing the process. Upon finding the optimal field device control parameters (such as valve control parameters), the parameters are fed into the field device controller controlling the real field device, e.g. a valve.

BRIEF DESCRIPTION OF THE DRAWINGS

The invention will now be described in more detail by means of preferred embodiments, with reference to the attached drawings, in which FIG. 3 illustrates a direct digital control (DDC) system architecture, FIG. 4 illustrates a distributed control system (DCS) architecture, FIG. 5 illustrates a field control system (FCS) architecture.

PREFERRED EMBODIMENTS OF THE INVENTION

The present invention can be applied to all industrial processes and the like, comprising at least one process control loop with a process controller, a field device controller and a field device. The invention is not restricted to any particular field device but the invention can be used with a variety of field devices, i.e. process devices, such as control valves, pumps, and screens, controlling the process and having a dedicated control algorithm which can be tuned. Pumps are typically used for pumping material forward in the process, or into or out of the process. In a pump, the field device controller may be an inverter controlling the rotation speed of the pump. In pulp and paper industry, for example, screens are used for screening the fibers into accepted ones and rejected ones. In a screen, the field device controller may be an inverter and an associated control circuit which control the rotation speed of the screen. In the following, however, the preferred embodiments of the invention will be described using control valves and valve controllers as examples.

Figure 1:
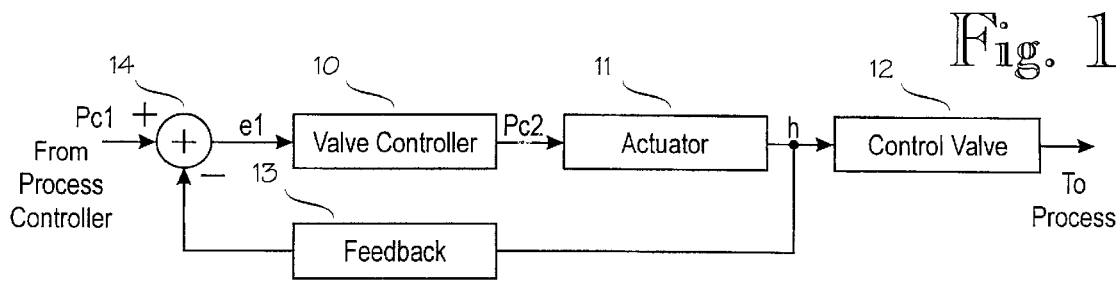
FIG. 1 shows a functional block diagram of a control valve.
Figure 2:
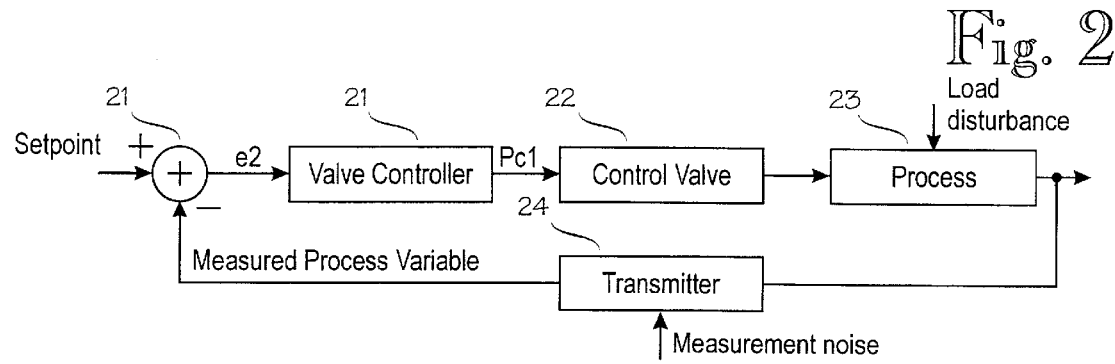
FIG. 2 illustrates a typical model of a process control loop.

The basic functional models for a process control loop and control valve are shown in FIGS. 1 and 2 and described above. It should be appreciated that these functional models are only one way of describing the control loop and the control valve, and there may be various modifications in the presentation and modelling without departing from the present invention.

Various control system architectures are illustrated in FIGS. 3, 4 and 5. The automation system comprises control room programs and databases as well as process control programs and user interfaces depicted by control computers 30, 40 and 50 in FIGS. 3 to 5. There are various alternative ways to arrange the interconnection between the control room computer and the field devices.

Traditionally, as illustrated in FIG. 3, the field devices 31 to 33 have been connected to the control system by two-wire twisted pair loops, each device being connected to the control system by a single twisted pair 35 providing a 4 to 20 mA analog input signal. The process controller (PID) has been located in a centralized computer system 30 in a control room. This type of process control system is often called a Direct Digital Control (DDC) system. In a second phase of the evolution of control systems, a Distributed Control System (DCS) shown in FIG. 4 is used, in which the process controllers (PIDS) are distributed in several computers 45 to 47 in the plant. The distributed computers and the central computer 40 in the control room may be interconnected by a local data network or data bus 48, for example, but the remote field devices 41 to 44 are still connected to the process controllers by the two-wire twisted pairs 49. More recently, new solutions, such as Highway Addressable Remote Transducer (HART) protocol, that allow the transmission of digital data together with the conventional 4 to 20 mA analog signal in the twisted pair loop have been used in the control systems. In the most recent phase of evolution, a Field Control System (FCS) shown in FIG. 5 employs a totally digital high-speed network or data bus 55 for interconnecting the control room computer 50 and the field devices 51 to 54. The conventional analog 4 to 20 mA signals are omitted in the FCS. A new communication protocol, which is generally referred to as Fieldbus, has been defined by the Instrument Society of America (ISA).

The preferred embodiments of the invention will be described as applied in a field control system architecture. According to the preferred embodiments of the invention, the process controllers (e.g. PIDs) are distributed to the field devices, i.e. they are integrated with the respective valve controller, the actuator, and the control valve. This arrangement has several advantages as will be explained below. However, the present invention can also be applied in other control system configurations and architectures.

Figure 6:
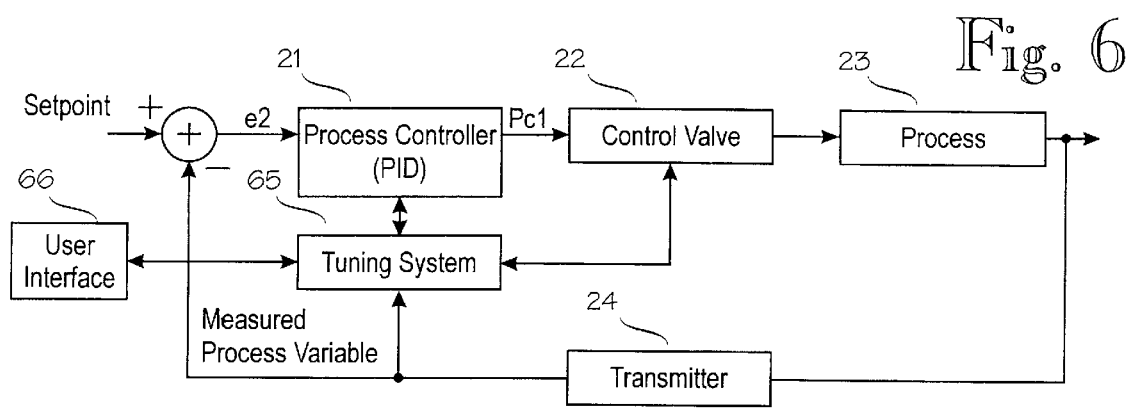
FIG. 6 shows a block diagram of a process control loop provided with a tuning system according to the invention.

FIG. 6 shows a functional block diagram of a process control loop provided with an inventive tuning system. The process controller 21, the control valve 22, the process 23 and the transmitter 24 may be similar to those described in FIG. 2. The internal structure of the control valve 22 may be similar to that shown in FIG. 1. A tuning system 65 is provided to control the process controller 21 and the control valve 22 as well as to receive status, control and measurement information from them. The tuning system 65 is also arranged to obtain from the process 23 process variability measurement data or the data from which the process variability can be derived. In the embodiment of FIG. 6, the tuning system 65 receives the measured process variable from the transmitter 24. The tuning system 65 also comprises a user interface 66 for interaction with the personnel in the control room, for example. In the preferred embodiment of the invention, a main part of the tuning system 65 is placed in the same field device with the process controller and the control valve. However, the user interface 66 and the tuning tools related to interaction with the user are preferably located in the control room computer or in a dedicated work station in the control system. This arrangement allows the use of the same tuning tools for all field devices in the process. However, the location of different functions of the tuning system is not critical to the present invention but the different functions can be located or distributed in various elements in the control system, if desired.

In the preferred embodiment of the invention, the tuning system 65 is provided with three main modes of operation. The first mode of operation includes a model identification and a calculation of rough tuning parameters during normal process operation. Three different models are identified (or determined) online or offline, namely, a process model, a valve model and a combined valve and process model, (i.e. a process model which inherently includes a valve model). The process model and the combined valve and process model are, for example, first-order and dead-time models, and the valve model is a non-linear physical model. Identification data is generated from measurement data from a process, either by normal process operation, or by adding a suitable test signal to the process controller output during a specific identification period. Suitable identification methods include, for example, LS (Least Squares), RLS (Recursive LS) and neural networks. A particular system dead time can be identified by cross-correlation methods. The physical model of the valve is based on the known physical structure and dimensions of the valve and some variable parameters, such as a friction coefficient.

In the first mode of operation, upon identifying the different models required, a rough tuning of the process controller 21 can be done using the combined valve and process model, and λ tuning rules, for example. The activation of the rough tuning of the process controller can, preferably, be done only by user request via the user interface 66.

Figure 7:
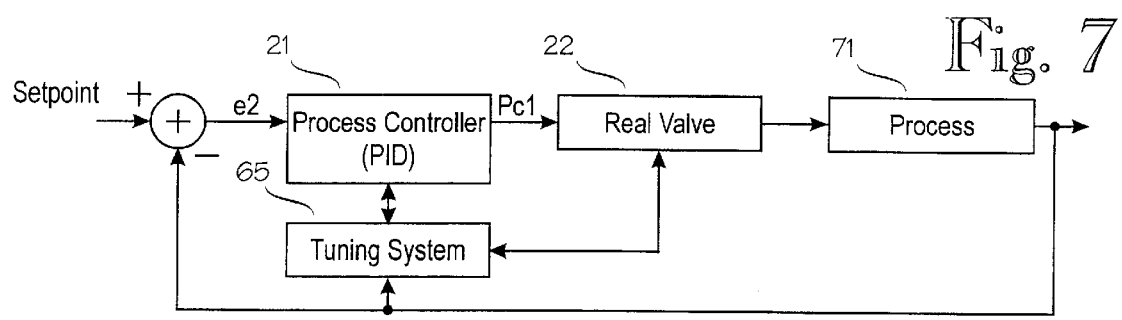
FIG. 7 is a functional block diagram illustrating fine-tuning with a real valve and a simulated process.
Figure 8:
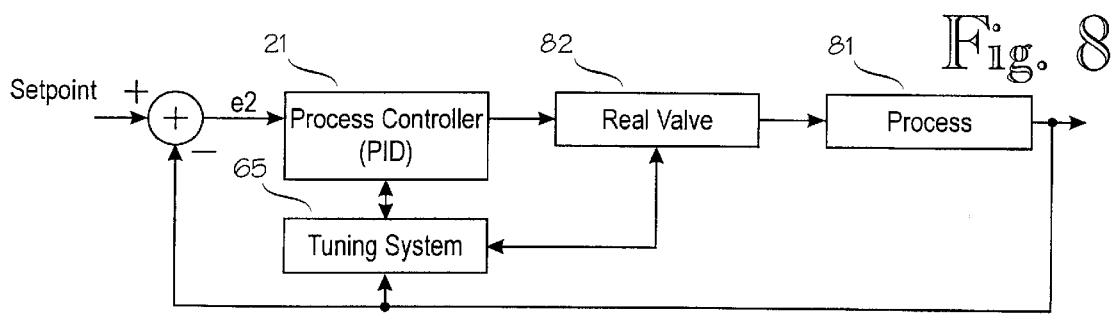
FIG. 8 is a functional block diagram illustrating fine-tuning with a simulated valve and a simulated process.

The second mode of operation is fine-tuning during process shutdown. In this mode, a real valve 22 controls a simulated process 71, as illustrated in FIG. 7. In other words, the process controller 21 controls a real valve, and a measured valve position (e.g. the position information h in FIG. 2) is fed into a simulated process 71. In response to the entered position information (h), the simulated process provides a process variable which is fed back to the process controller 21 and to the tuning system 65 in a similar manner as the measured process variable in FIG. 6. An error signal e2 is derived from the set point and the process variable, and thereby a control process loop with a simulated process is provided. The tuning system 65 may cause a simulated load disturbance in the process 71 by for example adding a test signal to the input signal $P_{c1}$ to the real valve or by changing suitable parameters in the simulated process 71. The tuning system 65 measures the system variability at the output of the simulated process 71 and changes the parameters of the process controller 21 and the valve controller in the real valve 22 until the controller parameter set which provides the best or desired performance is found, as will be explained in more detail below. In practice, the simulated process 71 may be the process model within the tuning system 65, or alternatively somewhere else in the control system. The decision when the optimal or desired control loop performance has been achieved can be made either by the tuning system automatically or by the user via the user interface 66. The selected controller parameters may be those which provide the minimum process variability during the fine-tuning process, or the worst parameters which fall below a predetermined threshold value. The control parameters which are changed or tuned during the fine-tuning may include, for example, the gain of the controller (e.g. the P in the PID controller). The fine-tuning during the process shut down and the use of the simulated process makes it possible to tune the controllers with more extensive variation in the process load disturbance than is possible during normal process operation.

The third mode of operation is fine-tuning with a simulated valve 82 and a simulated process 81. In other words, the control signal $P_{c1}$ from the process controller 21 is fed into the simulated valve 82 which provides, by means of the physical model of the real valve 22, a simulated valve position. This simulated valve position is fed into the simulated process 81 which, by means of the process model, outputs a process variable. This process variable is fed back to the process controller 21 and the tuning system 65. Again, an error signal e2 is derived from the set point and the estimated process variable and entered into the process controller 21. Thereby, a process control loop with a simulated valve and a simulated process is provided. In practice, the simulated valve 82 and the simulated process 81 may be the physical valve model and the process model within the tuning system 65. The tuning system 65 fine-tunes the process controller and the valve controller of the simulated valve 82 in a similar manner as described in FIG. 7.

As noted before, there are various alternatives to the hardware implementation of the present invention. However, the fieldbus implementation (i.e. the FCS architecture) offers a flexible and the most realistic environment to test the operation of new tuning parameters by means of simulation. To implement the concepts in the tuning system described above only an implementation of a simple simulation block (i.e. simulation software using the process and valve models for simulation of the valve and process) is required in the same field device as the controllers or in an additional field device or PC. This approach includes direct utilization of the implemented control structure in the simulation and testing. This means that not only a simple process control loop but also the whole process can easily be tested. Thus, the effects of tuning one process control loop in the whole process can be easily analyzed. Further, the correct placing of the identification, simulation and tuning algorithms in the field device ensures an exact sample time (i.e. an accurate timing of the sampling) and thereby a more accurate model identification, simulation and tuning.

Figure 9:
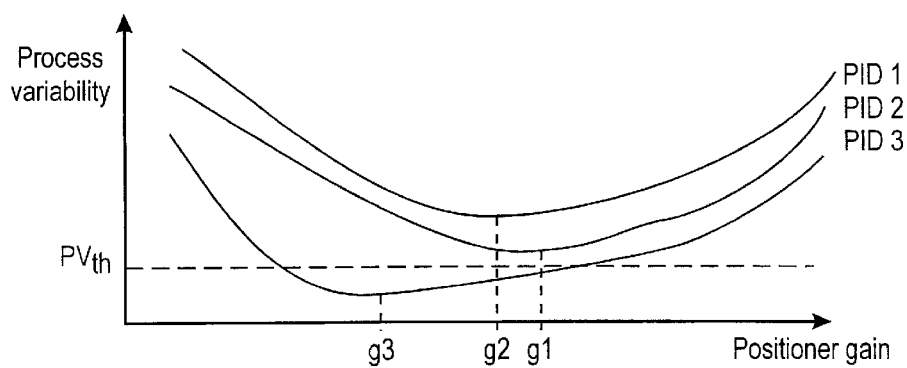
FIG. 9 is a draft illustrating the change of the process variability during the tuning process according to the invention.

The effect of the present invention on the process variability is illustrated in FIG. 9. The Y axis shows a value of a controlled variable, such as a flow volume, or any other desired variable. The purpose of the process control loop is to maintain the controlled variable at the set point value as well as possible. In general terms, the process variability represents the variation of the controlled variable in time. The smaller the process variability, the better the control loop performance. There are various methods suitable for measuring the process variability, such as the maximum deviation, ITAE, ITE, ITSE, ISTE, variance, etc.

With reference to FIG. 9, the process variability in the time range from 0 to 50 seconds is very large. At 50 seconds the tuning system 65 is set to the rough-tuning mode and the process controller 21 is rough-tuned as described above. As a result, the process variability is considerably reduced. At 100 seconds, the tuning system 65 enters to the third mode of operation and fine-tunes the process controller and valve controller to optimally work with each other, by using the simulated valve and the simulated process during normal operation. After fine-tuning, the process variability is minimized.

The preferred embodiments of the tuning procedure performed by the tuning system 65 will be now described with reference to FIGS. 10 and 11. Firstly, it is assumed that the process model, the physical valve model and the combined process and valve model have been identified before starting the tuning procedure. In a first tuning cycle, the process controller 21 is rough-tuned at step 101. At step 101 the tuning system 65, or the user operating the tuning system 65, decides whether the rough-tuning is to be completed or not. The decision may be based on any criterion depending on the process, the controlled process variable and the tuning algorithm, for example. For instance, the rough-tuning may be considered to have been carried out successfully, when the measured process variability is within a predetermined range (below a predetermined threshold). The rough-tuning is iterated in the loop 101 and 102 until tuning is found completed in step 102, and the control system 65 enters into either the second or the third mode of operation described above. At step 103, the valve controller 22 is tuned according to the tuning method used. For example, the valve controller may be tuned so that the measured process variability with the present controller parameters of the process controller 22 is minimized. Referring to FIG. 11, let us assume that the curve PID1 illustrates the measured process variability as a function of the positioner gain (the valve controller gain) for the rough-tuned process controller 21. The valve controller tuning continues in the loop 103 and 104 and tests different gain values until the positioner gain value which results in the smallest process variability value on the curve PID1 is found, i.e. the positioner gain g1 in FIG. 11. Then the gain of the valve controller 22 is set to the value g1, and the tuning procedure proceeds from step 104 to step 105. At step 105, the tuning system 65 checks whether the desired process variability has been achieved. The check can be made either by the user or automatically by the tuning system 65. For example, the desired process variability may be below a predetermined threshold value, such as the process variability $PV_{th}$ in FIG. 11. Because the minimum process variability on the curve PID1 is higher than the threshold $PV_{th}$, the tuning procedure returns to step 101, in order to begin a new tuning cycle. In the loop 101 to 102, the process controller 22 is tuned to provide the best possible loop control performance with the new parameters of the valve controller 22. When the optimal parameters, PID2, are found at step 102, the process controller 21 is set to operate with the new parameters. The tuning of the valve controller 22 is then carried out with the new process controller parameters. Again, different positioner gain values are tested and the respective process variability values are measured in the loop 103 to 104 until the gain value which results in the minimum process variability is found. With reference to FIG. 11, let us assume that the curve PID2 illustrates the process variability values as a function of the positioner gain for the new process controller parameters PID2. The minimum process variability is at gain g2 which is set as a new gain of the valve controller 22. Thereafter, the process variability achieved is compared with the threshold $PV_{th}$ at step 105. As can be seen in FIG. 11, the process variability is still higher than the threshold $PV_{th}$, and the tuning procedure returns to step 101. In the loop 101 to 102, the process controller 21 is tuned to give an optimal loop control performance with the new valve controller gain g2. Thereafter in the loop 103 to 104, different positioner gain values are tested until the gain value which minimizes the process variability is found. Referring again to FIG. 11, let us assume that the curve PID3 illustrates the process variability as a function of the positioner gain for the new process controller parameters PID3. The process variability minimum is now found at the positioner gain g3. The valve controller gain is set to the value g3 and the tuning procedure proceeds to step 105. Now the process variability at the gain value g3 is lower than the threshold $PV_{th}$, i.e. the desired process variability is achieved, and the tuning procedure ends. As can be seen in FIG. 11, tuning the process controller and valve controller to interact optimally results in a considerable lower process variability than in prior art tuning methods (which would result in a process variability according to the curve PID1 or higher.

Figure 10:
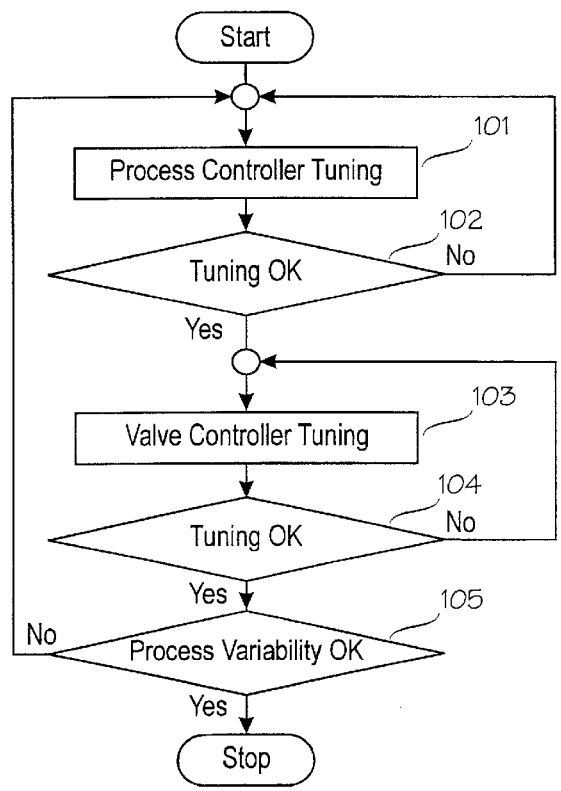
FIG. 10 is a flow diagram illustrating a fine-tuning process of the process controller and valve controller.
Figure 11:
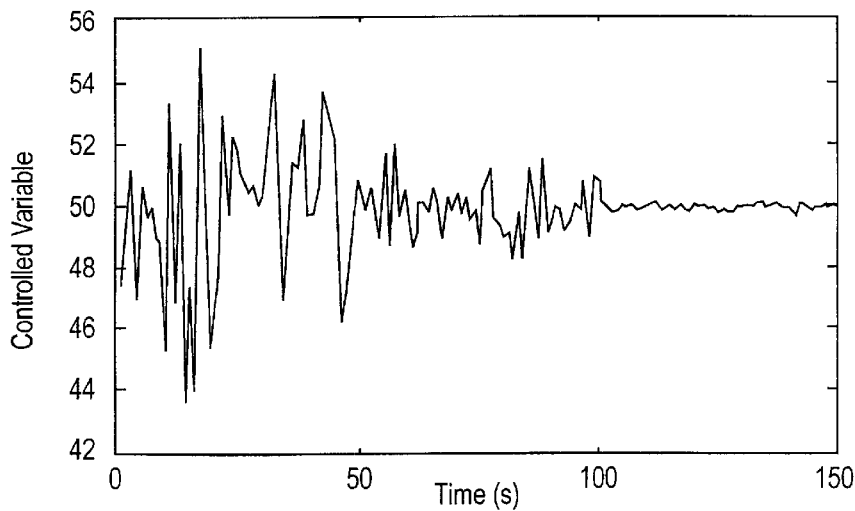
FIG. 11 is a draft illustrating the process variability as a function of the valve controller gain for different settings of the process controller.

It should be appreciated that the above description of the flow diagram of FIG. 10 is only an illustrative example of the tuning according to the present invention. The flow diagram of FIG. 10 can be implemented by various different ways. Further, the present tuning method is not restricted to the flow diagram according to FIG. 10 but the present invention can be implemented by any tuning sequence by means of which the process controller and the valve controller can be tuned to operate optimally with each other.

The invention and its embodiments are not restricted to the above described examples, but they can vary within the spirit and the scope of the attached claims.

What is claimed is:

1. A method of tuning a process control loop for controlling material flow within an industrial process, the process control loop including a process controller, a field device controller, a field device in the process, feedback from the field device to the field device controller, and process variable feedback from the process to the process controller, the method comprising:
   tuning the process controller,
   fine-tuning the field device controller and the process controller by, determining for the field device controller and the process controller, such control parameters that the interaction of the controllers provides a desired process variability.

2. The method of claim 1, wherein the desired process variability includes a minimum process variability measured during the fine-tuning.

3. The method of claim 1, wherein the desired process variability includes a value equal to or smaller than a predetermined threshold value.

4. The method of claim 1, wherein fine-tuning includes:
   a) tuning the field device controller to provide a minimum process variability with the tuned process controller,
   b) measuring the process variability,
   c) fine-tuning the tuned process controller to optimally operate with the fine-tuned valve controller, if the measured process variability is higher than the desired process variability,
   d) fine-tuning the field device controller to optimally operate with the fine-tuned process controller,
   e) measuring the process variability,
   f) repeating the operations c), d) and e) until the measured process variability reaches the desired process variability.

5. The method of claim 1, wherein the fine-tuning is performed during normal process operation.

6. The method of claim 1, wherein the fine-tuning is performed during a process shut-down with a real field device and a simulated process.

7. The method of claim 1, wherein the fine-tuning is performed with a simulated field device and a simulated process.

8. The method of claim 1, wherein the field device is a control valve, the field device controller is a valve controller, and the feedback is valve position feedback from the valve to the valve controller.

9. A control system comprising:
   a process control loop for controlling material flow within an industrial process, the process control loop including a process controller, a field device controller, a field device in the process, feedback from the field device to the field device controller, and process variable feedback from the process to the process controller,
   a tuning system for the process control loop, the tuning system fine-tuning the field device controller and the process controller by determining, for the field device controller and the process controller, such control parameters that the interaction of the controllers provides a desired process variability.

10. The system of claim 9, further comprising
    a field bus system for two-way digital communication between a control computer and a plurality of field units,
    wherein the process controller, the field device controller and the field device are in one unit connected to the field bus system.

11. The system of claim 10, wherein the tuning system is located in the control computer and arranged to communicate with the process controller and the field device controller via the field bus system.

12. The system of claim 9, wherein the tuning system being arranged to fine-tune during normal process operation.

13. The system of claim 9, wherein the tuning system is arranged to fine-tune during a process shut-down with a real field device and a simulated process.

14. The system of claim 9, wherein the tuning system is arranged to fine-tune during normal process operation using a simulated field device and a simulated process.

15. The system of claim 13, wherein the tuning system is arranged to fine-tune using a simulated field device and a simulated process.

16. The system of claim 9, wherein the field device is a control valve, the field device controller is a valve controller, and the feedback is a valve position feedback from the valve to the valve controller.

17. A method of tuning a process control loop for controlling material flow within an industrial process, the process control loop including a process controller, a field device controller, a field device in the process, feedback from the field device to the field device controller, and process variable feedback from the process to the process controller, the method comprising:
    tuning the process controller,
    fine-tuning the field device controller and the process controller by determining, for the field device controller and the process controller, such control parameters that the interaction of the controllers provides a desired process variability, the fine-tuning comprising:
    a) tuning the field device controller to provide a minimum process variability with the tuned process controller,
    b) measuring the process variability,
    c) fine-tuning the tuned process controller to optimally operate with the fine-tuned valve controller, if the measured process variability is higher than the desired process variability,
    d) fine-tuning the field device controller to optimally operate with the fine-tuned process controller,
    e) measuring the process variability,
    f) repeating the operations c), d) and e) until the measured process variability reaches the desired process variability.

18. A control system comprising:
    a process control loop for controlling material flow within an industrial process, the process control loop including a process controller, a field device controller, a field device in the process, feedback from the field device to the field device controller, and process variable feedback from the process to the process controller,
    a tuning system for the process control loop, the tuning system fine-tuning the field device controller and the process controller by determining, for the field device controller and the process controller, such control parameters that the interaction of the controllers provides a desired process variability, the tuning system being provided with a control program which carries out the following tuning sequence:
    a) tuning the field device controller to provide a minimum process variability with the tuned process controller,
    b) measuring the process variability,
    c) fine-tuning the tuned process controller to optimally operate with the fine-tuned valve controller, if the measured process variability is higher than the desired process variability,
    d) fine-tuning the field device controller to optimally operate with the fine-tuned process controller,
    e) measuring the process variability,
    f) repeating the operations c), d) and e) until the measured process variability reaches the desired process variability.

* * * * *